United States Patent [19]

Shen et al.

[11] Patent Number: 5,153,893
[45] Date of Patent: Oct. 6, 1992

[54] AERODYNAMIC WINDOW

[75] Inventors: Junguan Shen, Shanghai, China; Keming Du, Aachen, Fed. Rep. of Germany

[73] Assignee: Fraunhofer-Gesellschaft zur Forderung der Angewandter, Fed. Rep. of Germany

[21] Appl. No.: 512,382

[22] Filed: Apr. 20, 1990

[30] Foreign Application Priority Data

Apr. 21, 1989 [DE] Fed. Rep. of Germany ....... 3913187

[51] Int. Cl.⁵ .............................................. H01S 3/08
[52] U.S. Cl. ................................................... 372/104
[58] Field of Search .................................. 372/55, 104

[56] References Cited

U.S. PATENT DOCUMENTS

| | | | |
|---|---|---|---|
| 3,768,035 | 10/1973 | Zar | 372/104 |
| 3,851,273 | 11/1974 | Hoag et al. | 372/104 |
| 4,013,977 | 3/1977 | Behrens et al. | 372/104 |
| 4,821,283 | 4/1989 | Wildermuth et al. | 372/104 |

FOREIGN PATENT DOCUMENTS 836547 11/1958 United Kingdom .
1579101 5/1978 United Kingdom .

Primary Examiner—John D. Lee
Assistant Examiner—Robert E. Wise
Attorney, Agent, or Firm—Evenson, Wands, Edwards, Lenahan & McKeown

[57] ABSTRACT

An aerodynamic window for gas lasers, has an active chamber with a beam penetration opening free of solids. An end of a beam duct is connected to the beam penetration opening and is transversely penetrated by a nozzle duct of a gas flow window through which compressed gas can flow. A beam outlet opening delivers a laser beam to an exterior space which is preferably at atmospheric pressure. A suction chamber of a differential pump is provided between the other end of the beam duct and the beam outlet opening, and the working pressure of the differential pump is approximately equal to the pressure in the other end of the beam duct on the suction chamber side.

15 Claims, 1 Drawing Sheet

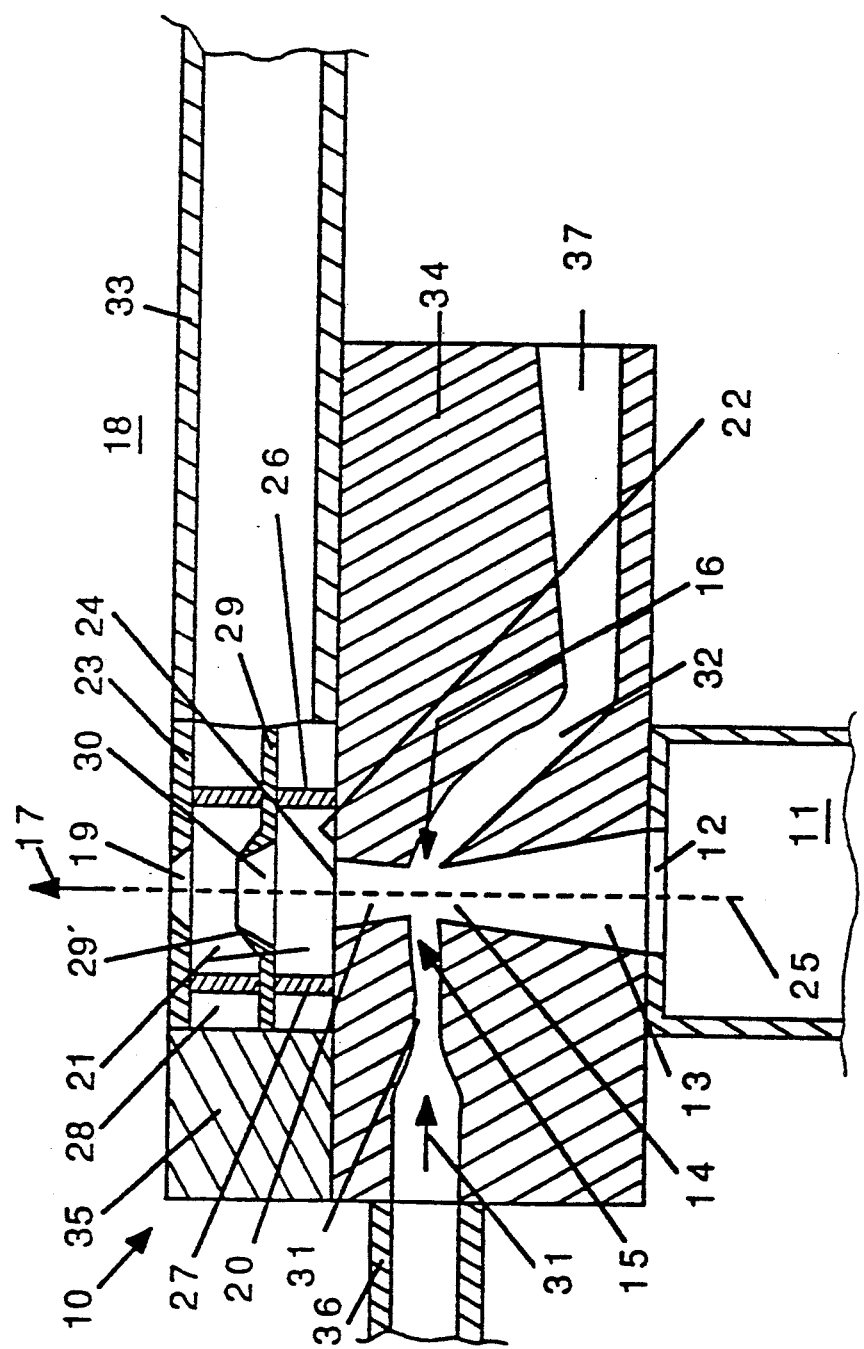

AERODYNAMIC WINDOW

BACKGROUND AND SUMMARY OF THE INVENTION

The present invention relates to an aerodynamic window for gas lasers. More particularly, the present invention is directed to a gas laser aerodynamic window with an active chamber having a beam penetration opening free of solids and to which an end of a beam duct is connected which is transversely penetrated by a nozzle duct of a gas flow. Furthermore, the aerodynamic window according to the present invention has a beam outlet opening which delivers the laser beam to an exterior space at preferably atmospheric pressure.

Laser irradiation is emitted from an active chamber through a beam penetration opening. This beam penetration opening forms a so-called window which, in the case of gas lasers, must prevent the discharge of the active material, namely gas, from the active chamber. This window normally consists of a beam-permeable solid material. In the case of high-power lasers, however, the materials absorb too much energy to be usable and have been replaced by aerodynamic windows in which a moving gas effects sealing.

A known aerodynamic window operates with a supersonic gas flow. A high pressure difference is maintained between the active chamber and the exterior space at atmospheric pressure by subjecting the laser chamber side to the static pressure in a gas flow range at a high Mach number, while a gas flow range at a low Mach number exists at the atmospheric pressure side. The fast-flowing gas effects sealing through a comparatively high pressure difference, but this is possible only with considerable amounts of gas and an annoying noise level. The large flow amounts result in optical interference with the laser beams, therefore impairing the beam quality. In addition, the operating pressure which can be achieved inside the laser chamber is largely determined by the nozzle duct profile.

Gas in motion for sealing purposes in aerodynamic windows can also be achieved by using a differential pump. The sealing effect is essentially based on the existence of a window chamber from which pumping takes place via a vacuum pump. This type of window is shown in DE-OS 35 10 057. The window chamber is arranged at an angle with respect to the axis of the laser beam. The beam penetrates through the beam penetration opening and the beam outlet opening, in an undeflected manner, through the window chamber. In this known window, the beam penetration and beam outlet openings are arranged in walls disposed at a right angle to one another in order to have a beam path which is as short as possible in the area located between the openings through which passes a turbulent flow. This turbulent flow interferes significantly with the beam quality.

In the case of the known aerodynamic windows, it is also a disadvantage that the mentioned openings are arranged diagonally with respect to the laser beam so that their cross-sectional surface for the unhindered passage of the laser beam must be larger than if it were arranged transversely with respect to the laser beam. As a result, an increased delivery volume of the pump is required, and, therefore an increased expenditure of energy as well as a more severe interference with the beaming quality are also required. During the operation of the differential pump, the window chamber must have a lower pressure than the active chamber in order to prevent an air flow into the active chamber. Vacuum pumps operate very inefficiently, however, at such low pressures and an undesirably high delivery volume is required.

Therefore, an object of the present invention is to improve an aerodynamic window for a gas laser in such a manner that the desired sealing effect can be achieved with a significantly improved beaming quality and particularly for different pressures in the laser chamber.

This object has been achieved in accordance with the present invention by providing a differential pump suction chamber between the other end of the beam duct and the beam outlet opening, and by making the working pressure of the differential pump approximately equal to the pressure in the other end of the beam duct on the side of the suction chamber.

It is an important feature of the invention that the suction chamber of a differential pump is connected behind the gas flow window, resulting in improved combined sealing devices. When the working pressure of the differential pump is approximately equal to the pressure in the other end of the beam duct on the side of the suction chamber, the sealing effect of the gas flow window need only correspond to the pressure difference between the suction chamber and the active chamber. In comparison with normal gas flow windows, this pressure difference is low. For this reason, only a reduced amount of gas is required for effective sealing so that the beaming quality is correspondingly less adversely affected, and the noise can be reduced considerably. Moreover, in comparison with known aerodynamic windows interacting with differential pumps, the differential pump can operate at a considerably higher pressure and therefore basically in a more effective manner. In addition, the pressure difference between the exterior space at atmospheric pressure and the suction chamber is comparatively low so that the delivery volume of the pump can be reduced considerably. When the working pressure of the differential pump is approximately equal to the pressure in the other end of the beam duct on the side of the suction chamber, practically no flow takes place between the gas flow window and the suction chamber if diffusion-caused gas movements are not taken into account. The quality of the laser irradiation between the combined windows is, as a practical matter, not influenced.

An advantage provided by the present invention is that the window is constructed such that two wall which are parallel with respect to one another form the boundaries of the suction chamber. A mouth of the end of the beam duct on the side of the suction chamber and the beam outlet opening are arranged on these walls on the beam axis opposite one another. A cylinder is provided which extends between the two parallel walls and forms the radial boundary of the suction chamber with respect to the beaming axis. The cylinder has a plurality of recesses distributed over its circumference and is surrounded by a suction annulus symmetrical with respect to the beaming axis. This arrangement permits a symmetrical guiding of the air flow into the suction chamber from the exterior space at atmospheric pressure, or of the gas into the suction chamber.

Another important factor of the present invention is that the flow takes place in the same axis or parallel to the axis of laser irradiation, so that any possible slight influence on the beaming quality by way of the cross-section of the laser beam takes place uniformly.

Additional improvements can be carried out within the scope of the present invention in the area of the suction chamber in order to assure a clean flow and a stable pressure in the suction chamber. For example, the window is constructed so that the recesses in the cylinder are distributed to cause a uniform amount of gas suction from the beaming axis in all radial directions. If, for instance, the suction chamber has a single suction duct, the recesses of the cylinder close to this duct will be individual or have a smaller cross-section in order to avoid an excessive gas suction from the suction chamber in proximity to the suction duct.

The beam outlet opening widens conically from the exterior space to the suction chamber in accordance with the present invention. This widening provides an immediate yet gradual reduction of the flow rate at the exterior-space side area of the suction chamber.

The aerodynamic window of the present invention advantageously provides a dividing plate in the suction chamber. The plate is arranged transversely with respect to the beaming axis and extends radially transversely through the chamber cylinder and the suction annulus, and has an opening in the area of the beaming axis. The dividing plate limits more extensive movements of the air entering through the beam outlet opening into the suction chamber to the area of the suction chamber located between the beam outlet opening and the dividing plate. The area of the suction chamber located on the beam duct side of the dividing plate is steadied and, more importantly, air flowing in through the beam outlet opening is precluded from adversely affecting the beam duct and, therefore, the gas flow window.

A particularly good shielding and also air guiding inside the suction chamber is obtained with the present invention by the fact that the opening of the dividing plate has a conical ring forming a flow shield. This conical ring tapers toward the beam outlet opening.

BRIEF DESCRIPTION OF THE DRAWINGS

These and further features, objects and advantages of the present invention will become more apparent from the following detailed description when taken in conjunction with the accompanying sole FIGURE which shows a presently preferred embodiment of an aerodynamic window in accordance with the present invention.

DETAILED DESCRIPTION OF THE DRAWINGS

An aerodynamic window designated generally by the numeral 10 connects to an active chamber 11, by way, for example, of a conventional safety valve (not shown for sake of clarity) which can close in a controlled and-/or automatic manner when a measured pressure deviates from or exceeds a predetermined the low pressure of, for example, 100 mbar.

The active chamber 11 has a beam penetration opening 12 for a laser beam 17 with a beam axis 25. The beam penetration opening 12 is free of solids, i.e., it is a simple opening in a wall of the chamber 11. A beam duct 14 of a gas flow window 16 has an axis coincident with the beam axis 25. The gas flow window 16 has a nozzle duct 15 through which compressed gas, such as air, flows in the flow direction illustrated by the arrow 31. The nozzle duct 15 penetrates the beam duct 14 transversely and, in a conventional manner, is equipped with a nozzle 38 and a diffusor 32 which is connected downstream of the nozzle 38 with respect to the flow direction 31 in order to achieve the desired sealing with the beam duct 14.

An end 20 of the beam duct 14 is opposite the end 13 of the beam duct 14 on the side of the laser chamber 11. The end 20 of the beam duct 14 leads into and is on the side of the suction chamber 21 of a conventional differential pump whose suction duct 33 is shown. The pump can be, for example, a vacuum pump.

The suction chamber 21 has two spaced, parallel walls 22, 23. Wall 22 constitutes a wall of a body 34 of the gas flow window 10 which adjoins the suction chamber 21, and wall 23 is a lid or cover of the suction chamber 21. The radial boundary of the suction chamber 21 and of a suction annulus surrounding the chamber 21 is a ring body 35 into which leads the differential pump suction pipe 33 which is directed to the suction chamber 21.

The wall 23 has a beam outlet opening 19 for the laser beam 17 which is arranged coaxially with the beam duct 14. In addition, the beam outlet opening 19 widens conically in a direction from exterior space 18 to the suction chamber 21.

A dividing plate 29 is arranged inside the suction chamber and divides the distance between the walls 22, 23 approximately in half. The plate 29 is provided along the entire radial boundary of the suction chamber 21 and projects into the suction annulus 28 so as also axially to divide this suction annulus 28. The dividing plate 29 has a central opening 30 coaxial to the beam duct 14 and to the beam outlet opening 19. The opening 30 is formed with a conical ring 29' which tapers inwardly in the direction toward the beam outlet opening 19.

The suction chamber 21 has a radial boundary defined by a cylinder 26 which extends along the entire height of the suction chamber 21 between the spaced walls 22, 23. The suction annulus 28 is situated radially between the cylinder 26 and the ring body 35. Gas present inside the suction chamber 21 is radially sucked out by the suction annulus 28. For this purpose, recesses 27, such as holes or slots, are provided in the cylinder 26. The size and distribution of the recesses 27 are configured accordingly to the desired flow of the gas to be removed from the suction chamber 21. For example, holes located more remotely from the pipe 33 can be larger and arranged more densely so that an amount of gas is sucked off there equal to the amount sucked off closer to the pipe 33.

The pressure inside the active chamber 11 can be set at, for example, 100 mbar. The chamber 11 must be sealed off with respect to the atmospheric pressure of approximately 1,000 mbar. This sealing takes place primarily by means of the gas flow window 16, into the nozzle duct 15 of which compressed gas is supplied, for example, at 3.8 bar which, until it reaches the outlet 37 of the duct 15, where it decreased to approximately atmospheric pressure.

The working pressure in the suction chamber 21 amounts to approximately 600 mbar. As a result, the gas flow window 16 need be configured only for the sealing of a differential pressure of approximately 500 mbar. This is a slight pressure difference in comparison with the conventional gas flow windows so that the amount of gas flowing therethrough may be lower. The operation also takes place at comparatively lower pressures so that a lower pressure gradient is obtained and the beaming quality of the laser beam 17 is negatively influenced to a considerably less extent.

The suction chamber 21 has a comparatively high working pressure, i.e. about 600 mbar, in comparison with conventional suction chambers of differential pumps for aerodynamic windows. The pressure difference with the exterior space 18 therefore amounts to only 400 mbar. For such a differential pressure, the suction chamber may be configured such that the air flows into the suction chamber 21 from the exterior space 18 at subsonic speed. In addition, the air flow can be guided very cleanly by virtue of the above-described construction of the suction chamber 21. The conical ring 29' forming a flow shield makes a significant contribution in this respect and guides a significant part of the air flowing in through the beam outlet opening 19 and expanding in the chamber 21 as a result radially toward the outside toward the cylinder 26 forming the boundary of the suction chamber 21.

By adjusting the pressure in the suction chamber 21 within certain limits (for example, by changing the suction output of the differential pump) and by adapting the pressure to the feeding of the compressed gas into the gas flow window 16, the sealing effect can be influenced so that also the pressure in the active chamber 11 can be changed within certain limits. If, for example, the pressure in the suction chamber 21 is lowered from 600 mbar to 580 mbar, the pressure in the laser chamber 11 can be lowered from, for example, 100 mbar to 80 mbar, if the feeding pressure of the compressed gas of the nozzle duct 15 is changed slightly. This results in the possibility of optimizing the window with respect to pump delivery and to the amount of gas to be passed through by correspondingly selecting the appropriate pressure in the suction chamber 21.

The working pressure of the suction chamber 21 and thus the working pressure of the differential pump is selected such that it is approximately equal to the pressure in the end 20 of the beam duct 14. As a result, no gas flow from the gas flow window 16 in the direction of the laser beam 17 into the suction chamber 21 occurs.

While a presently preferred embodiment has been shown and described, it should be understood that the same will now be susceptible to changes and modifications to one skilled in the art given the details disclosed herein. Therefore, it is not intended that the present invention be limited necessarily to what has been shown and described but rather that the invention be construed as defined in the appended claims.

What is claimed:

1. An aerodynamic window for gas lasers comprising an active chamber having a beam penetration opening free of solids, a beam duct having one end connected to the beam penetration opening, a gas flow window nozzle duct through which compressed gas can flow being arranged to penetrate the beam duct transversely, a beam outlet opening to deliver the laser beam along a beam axis to an exterior space, and a differential suction chamber between another end of the beam duct and the beam outlet opening, wherein a differential pump working pressure is approximately equal to a pressure at the another end of the beam duct on a side of the suction chamber.

2. The aerodynamic window according to claim 1, wherein the exterior space is at atmospheric pressure.

3. The aerodynamic window according to claim 1, wherein a boundary of the suction chamber comprises two opposed parallel walls in which the another end has a mouth, and the mouth and the beam outlet opening are arranged on or parallel to the beam axis, a cylinder extends between the walls to form a radial boundary of the suction chamber with respect to the beam axis, a plurality of recesses is distributed over a circumference of the cylinder, and a suction annulus surrounds the cylinder.

4. The aerodynamic window according to claim 3, wherein the recesses are operatively distributed such that a gas suction from the beam axis is radially uniform.

5. The aerodynamic window according to claim 3, wherein the beam outlet opening conically widens from the exterior space in a direction toward the suction chamber.

6. The aerodynamic window according to claim 1, wherein a dividing plate is provided in the suction chamber transversely to the beam axis and extending radially across the cylinder and the suction annulus, with an opening in the area of the beam axis.

7. The aerodynamic window according to claim 6, wherein the exterior space is at atmospheric pressure.

8. The aerodynamic window according to claim 7, wherein a boundary of the suction chamber comprises two opposed parallel walls in which the another end has a mouth, and the mouth and the beam outlet opening are arranged on or parallel to the beam axis, a cylinder extends between the walls to form a radial boundary of the suction chamber with respect to the beam axis, a plurality of recesses is distributed over a circumference of the cylinder, and a suction annulus surrounds the cylinder.

9. The aerodynamic window according to claim 8, wherein the recesses are operatively distributed such that a gas suction from the beam axis is radially uniform.

10. The aerodynamic window according to claim 8, wherein the beam outlet opening conically widens from the exterior space in a direction toward the suction chamber.

11. The aerodynamic window according to claim 6, wherein the opening of the dividing plate has a conical ring tapering inwardly toward the beam outlet opening.

12. The aerodynamic window according to claim 11, wherein the exterior space is at atmospheric pressure.

13. The aerodynamic window according to claim 12, wherein a boundary of the suction chamber comprises two opposed parallel walls in which the another end has a mouth, and the mouth and the beam outlet opening are arranged on or parallel to the beam axis, a cylinder extends between the walls to form a radial boundary of the suction chamber with respect to the beam axis, a plurality of recesses is distributed over a circumference of the cylinder, and a suction annulus surrounds the cylinder.

14. The aerodynamic window according to claim 13, wherein the recesses are operatively distributed such that a gas suction from the beam axis is radially uniform.

15. The aerodynamic window according to claim 13, wherein the beam outlet opening conically widens from the exterior space in a direction toward the suction chamber.

* * * * *